(12) United States Patent
Benz et al.

(10) Patent No.: US 6,220,497 B1
(45) Date of Patent: Apr. 24, 2001

(54) METHOD FOR SOLDERING MICROSTRUCTURED SHEET METAL

(75) Inventors: Uwe Benz, Uhldingen-Muehlhof; Lothar Haug, Esslingen; Wolfgang Kleinekathoefer, Waldstetten; Peter Waitkat, Neuhausen, all of (DE)

(73) Assignee: Xcellsis GmbH, Kirchheim (DE)

( * ) Notice: Subject to any disclaimer, the term of this patent is extended or adjusted under 35 U.S.C. 154(b) by 0 days.

(21) Appl. No.: 09/232,705

(22) Filed: Jan. 19, 1999

(30) Foreign Application Priority Data

Jan. 16, 1998 (DE) .............................. 198 01 374

(51) Int. Cl.⁷ .................................. B23K 1/20
(52) U.S. Cl. ................... 228/118; 228/183; 228/214; 228/215; 228/219
(58) Field of Search ................ 228/118, 183, 228/212, 214, 215, 219, 221, 245, 246, 248.1, 252, 262.31, 262.42, 262.61, 262.71; 165/167, 166

(56) References Cited

U.S. PATENT DOCUMENTS

| | | | |
|---|---|---|---|
| 3,650,005 | * | 3/1972 | Kamiya et al. ................ 29/157.3 |
| 3,846,903 | * | 11/1974 | Rupert et al. ................... 29/487 |
| 4,135,656 | * | 1/1979 | Stern ............................. 228/263 |
| 4,516,632 | * | 5/1985 | Swift et al. .................... 165/167 |
| 5,058,665 | * | 10/1991 | Harada .......................... 165/164 |
| 5,070,607 | * | 12/1991 | Boardman et al. ........ 29/890.042 |
| 5,251,374 | * | 10/1993 | Halstead et al. .......... 29/890.047 |

FOREIGN PATENT DOCUMENTS

| | | |
|---|---|---|
| 39 26 466 A1 | 2/1901 | (DE) . |
| 44 26 692 C1 | 7/1994 | (DE) . |
| 197 08 472 | 9/1998 | (DE) . |
| WO 88/06941 | 9/1988 | (EP) . |
| 9837457 | * 8/1998 | (WO) ................ G03F/7/00 |

OTHER PUBLICATIONS

Schweissen und Schneiden, Bd. 45, Nr. 8, Aug., 1993, pp. 427–429.

* cited by examiner

Primary Examiner—Patrick Ryan
Assistant Examiner—M. Alexandra Elve
(74) Attorney, Agent, or Firm—Evenson, McKeown, Edwards & Lenahan, P.L.L.C.

(57) ABSTRACT

In method for soldering metal microstructured plates, stacks of plates and solder layers are prepared by placing the solder layers between each adjacent plate. The thickness of the solder layers range from 3 to 25 $\mu$m. The stack is then soldered by heating it in a vacuum or an inert atmosphere.

27 Claims, 3 Drawing Sheets

METHOD FOR SOLDERING MICROSTRUCTURED SHEET METAL

BACKGROUND AND SUMMARY OF THE INVENTION

This application claims the priority of German Application No. 198 01 374.4, filed Jan. 16, 1998, the disclosure of which is expressly incorporated by reference herein.

The invention relates to a method for soldering microstructured sheet metal to form a compact unit, e.g., a thermal transfer microdevice or microreactor.

Thermal transfer microdevices or microreactors consist of individual, thin, finely grooved metal plates. These grooves serve to form channels for carrying the medium involved. The plates are stacked one on top of the other, and are provided with base plates and cover plates which results in a compact unit. Thermal transfer microdevices or microreactors make it possible (by their fine channeling) to transfer a maximum of heat or power between two or more media within a very small space.

The component must satisfy important requirements in regard to both the sheet material used and the manner in which they are joined. These requirements include: sufficient hermeticity (helium leakage test; $1 \times 10^{-6}$ mbar l/s) between both the passages for the reliable separation of the media used and from the environment; sufficient strength; free circulation throughout the entire patterned area; resistance to corrosion by the media carried; and thermal stability up to 450° C.

Conventional adhering methods (fusion welding, diffusion welding, or cementing, for example) are unable to satisfy all the requirements of an entire packet of such plates, even in today's state of knowledge.

Fusion welding cannot be employed to precisely assemble a plurality of plates (at the areas to be joined), and is also very time consuming and costly. Moreover, each time the very thin metal plates are welded together, material distortion must be expected. This material distortion will accumulate additively throughout the entire stack. Diffusion welding, on the other hand, calls for very high surface quality with regard to roughness, cleanliness and accuracy in the shape of the metal plates. This can only be achieved with great difficulty, if at all. Cementing the plates together fails to satisfy the requirement of stability at 450° C., and thus is not adequate.

Soldering in an inert atmosphere or in a vacuum is a known method for joining metal plates. A certain amount of suitable solder must be present in the plane of the joints. Usually, in the production of conventional heat transfer devices and reactors, the solder materials in this process have foil thicknesses or powder particle dimensions which are substantially greater than 25 µm. Such solder thicknesses, however, are not suitable for joining very thin, finely channeled metal plates. This is due to the danger of excess solder which may restrict or entirely block these fine channels, and thus interfere with or even prevent the desired guidance of the flow of the medium within the plate or component.

Thermal transfer microdevices are disclosed in German patent document DE 44 26 692 C1 and in WO 88/06941. In both these references, soldering is the method used to join the grooved plates. However, further details of this method are not disclosed in these references.

It is therefore an object of the present invention to provide a method for soldering microchanneled metal plates by which a required satisfactory stable bond is achieved while at the same time preventing the obstruction of the microchannels.

These and other objects and advantages are achieved by the method for soldering metallic microstructured plates according to the invention, in which solder layers, having a thickness which amounts to from 3 to 25 µm, are provided between adjacent plates of a stack of microchanneled metal plates. Utilizing heat, the stack is then soldered together in a vacuum or an inert atmosphere.

The solder layer thickness according to the invention, which ranges between 3 and 25 µm, assures that the amount of solder available results in a stable satisfactory joint, while at the same time the fine microchannels will not be blocked.

Regarding the manner in which the solder layers are placed between the plates in the stack, several embodiments are possible.

In a first embodiment of the invention, the plates are coated with solder to a thickness of about 3 to 25 µm, and then stacked one on top of the other. The stack is then soldered together by applying heat in a vacuµm or inert atmosphere. The solder layer can be applied, for example, in the form of a film, paste or powder or applied galvanically to the plates to be joined together.

In an alternative embodiment, uncoated plates are stacked, with solder foils having a thickness of about 3 to 25 µm placed between them. The stack is then soldered together by heating it in a vacuum or inert atmosphere.

In all embodiments according to the invention, the solder layers are to be applied with the greatest possible uniformity, especially with a constant thickness. The solder can be applied both to the channeled and/or to the unchanneled surfaces of the plates or portions thereof.

Examples of materials which can be used as solder are copper and copper alloys (especially CuPd copper-palladium alloy with 10 to 22 wt. %, preferably 15 to 20 wt. % of palladium); nickel alloys (especially NiP nickel-phosphorus alloy with 7 to 14 wt. %, preferably 9 to 12 wt. % of phosphorus); gold and gold alloys (especially AuNi gold-nickel alloy with 10 to 22 wt. %, preferably 15 to 20 wt. % of nickel); and silver and silver alloys (especially AgTi silver-titanium alloys with 2 to 6 wt. %, preferably 3 to 5 wt. % of titanium).

The distances between the metal surfaces to be joined should advantageously range from a few micrometers to a maximum of 0.01 mm, so that they can be covered by the solder present. To achieve such a spacing, it is necessary (while applying heat) to exert an appropriate pressure on the component being soldered.

The term plates (within the meaning of the invention) is to be understood to refer to any kind of metal components, in the form of, for example, planar, flat slabs, ribbons or films. Examples of appropriate materials are steels (e.g., 1.4301, 1.4401, 1.4404, 1.4541, 1.4571); nickel, nickel alloys; lead, lead alloys; and copper, copper alloys.

The microchanneling of the plates is performed by known methods, e.g., by microtexturing methods using high-precision tools, by etching, milling, embossing, stamping or wire erosion. All of the methods described in German patent document DE 44 26 692 C1 and WO 88/06941 are suitable.

To prevent the obstruction by excess solder (whether entire or partial) of the channels provided for carrying fluid or for reactions, solder trapping channels can be provided on the plates as an additional preventative measure. The dimensions of these channels, as regards width and depth, are to be especially equal to or greater than the fluid-carrying channels. These solder trapping channels can be disposed especially at those areas of the microchanneling which are critical for carrying the flow. The solder trapping channels fill up, as intended, with the excess solder, so that the fluid carrying channels remain free and unobstructed.

To prevent any dispersion of the solder in particular areas of the plates, a means can advantageously be used by which the wetting of the base material by the solder is prevented.

The method of the invention is suitable for the production of the following devices, for example, microreactors, thermal transfer microdevices; high power evaporators (heat exchanging microplates), oil heated or catalytically heated; and membrane modules for hydrogen gas separation.

These devices can especially be used for fuel cell systems with integrated hydrogen generation for mobile applications, e.g., on board a vehicle.

Other objects, advantages and novel features of the present invention will become apparent from the following detailed description of the invention when considered in conjunction with the accompanying drawings.

DETAILED DESCRIPTION OF THE DRAWINGS

Figure 1A:
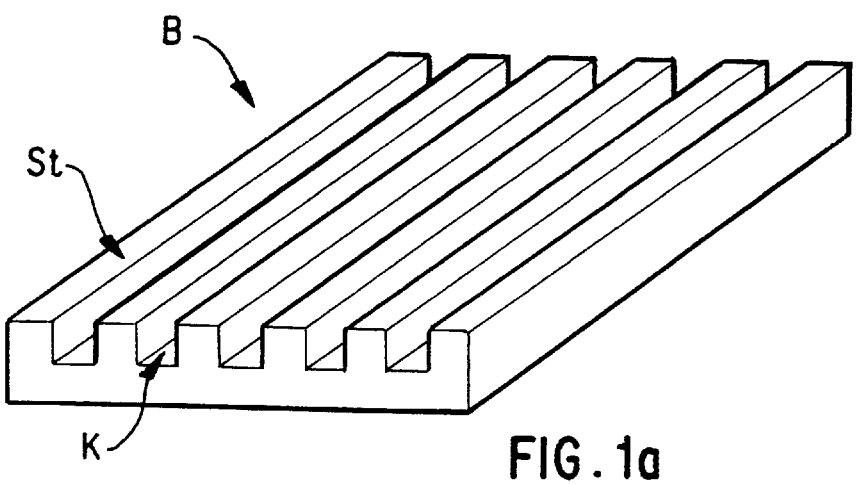
FIG. 1 shows three examples of the possible microstructuring of the plates.
Figure 1B:
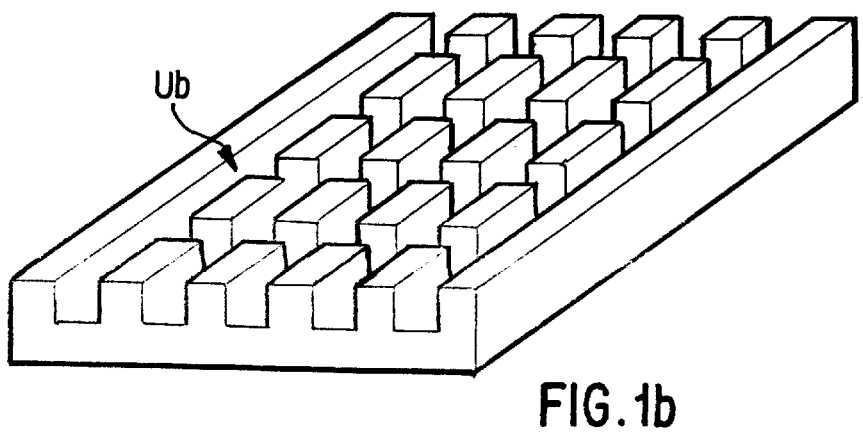
Figure 1C:
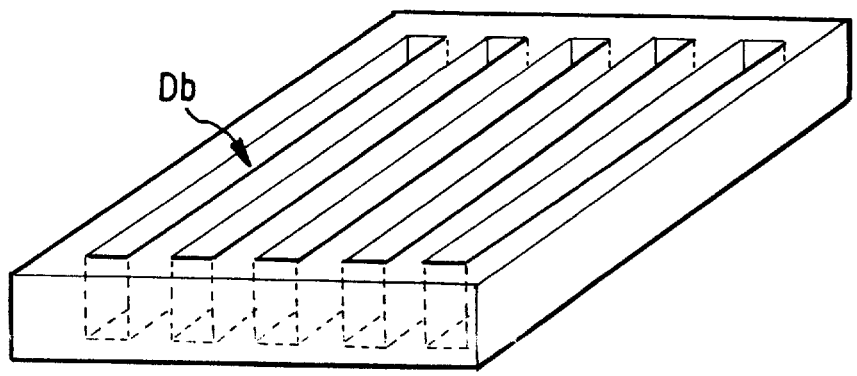

FIG. 1 shows three examples of the possible microstructuring of plates B, as they can be used in the present invention. The thickness of the plates is preferably in the range of 0.025 mm to 10 mm. The lengths of the edges of the plates amounts in typical embodiments to as much as 300 mm×300 mm.

Figure 2A:
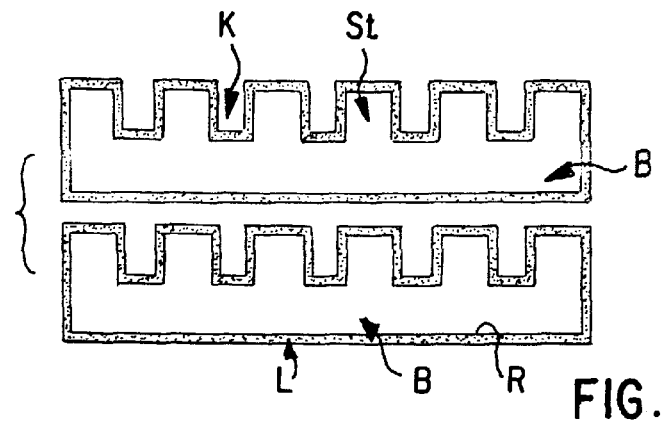
FIGS. 2(a)–2(d) and 3 show examples of implementating the method according to the invention.

In an embodiment of the invention as shown in FIG. 2(a), the plate B has a parallel channel structure wherein the individual channels are separated by ridges St. The channels K and the ridges St have a constant, rectangular cross section.

Figure 2B:
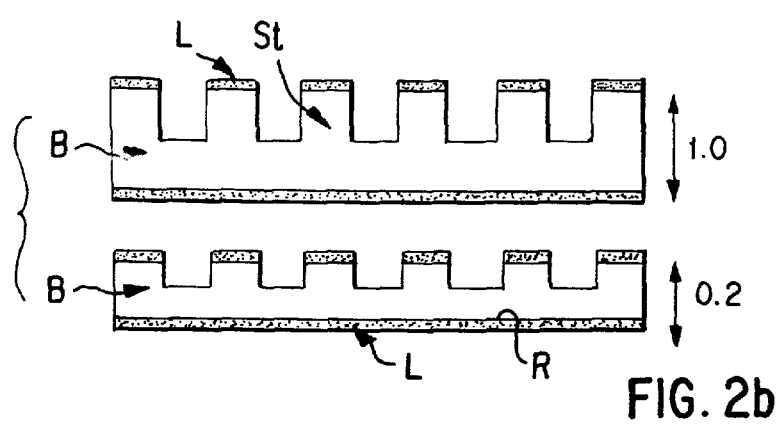

In an embodiment of the invention as shown in FIG. 2(b), the ridges have interruptions Ub at regular intervals.

Figure 2C:
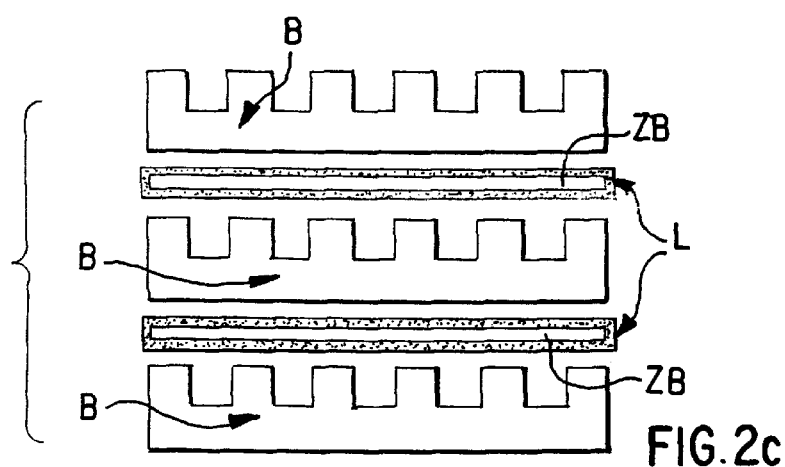

In an embodiment of the invention as shown in FIG. 2(c), the plate B has slot-like, parallel openings Db.

Naturally, in addition to the structure shown, any other structuring is possible.

Typical dimensions of the structures (channels and ridges) are:

Channel depth: from 0.1 mm to 0.4 mm and deeper;
Channel width: from 0.1 mm to 10 mm and wider;
Ridge width: from 0.1 mm to 10 mm and wider; and
Ridge height: from 0.1 mm to 0.4 mm and higher.

FIGS. 2(a)–2(d) and 3 show examples of individual process steps of the method according to the invention. In a first step (FIG. 2(a)) the solder L is applied to the plates B that are to be joined.

In the embodiment of the invention shown in FIG. 2(a), the entire surface of the two plates, i.e., ridges St, channels K, the unchanneled back R and the lateral surfaces are coated with solder. This can be done especially by known galvanic coating techniques.

In the embodiment of the invention shown in FIG. 2(b), only the ridges St and the backs R of the two plates are coated with solder. Appropriately shaped films, for example, can be used for this purpose.

In the embodiment of the invention shown in FIG. 2(c), an unchanneled plate ZB is present between two channeled plates B. This plate ZB is coated on both sides in this embodiment. It serves as a junction plate between the adjacent channeled plates B.

Figure 2D:
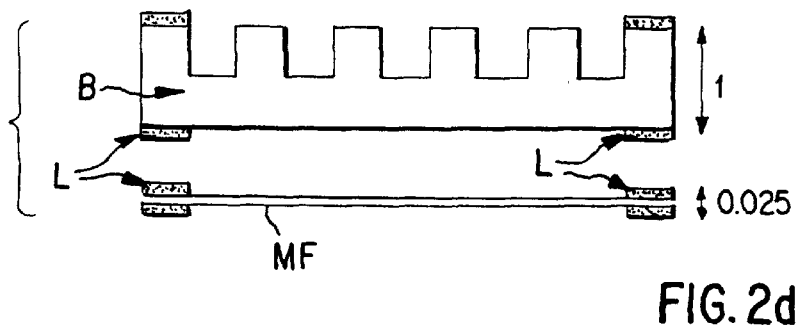
Figure 3A:
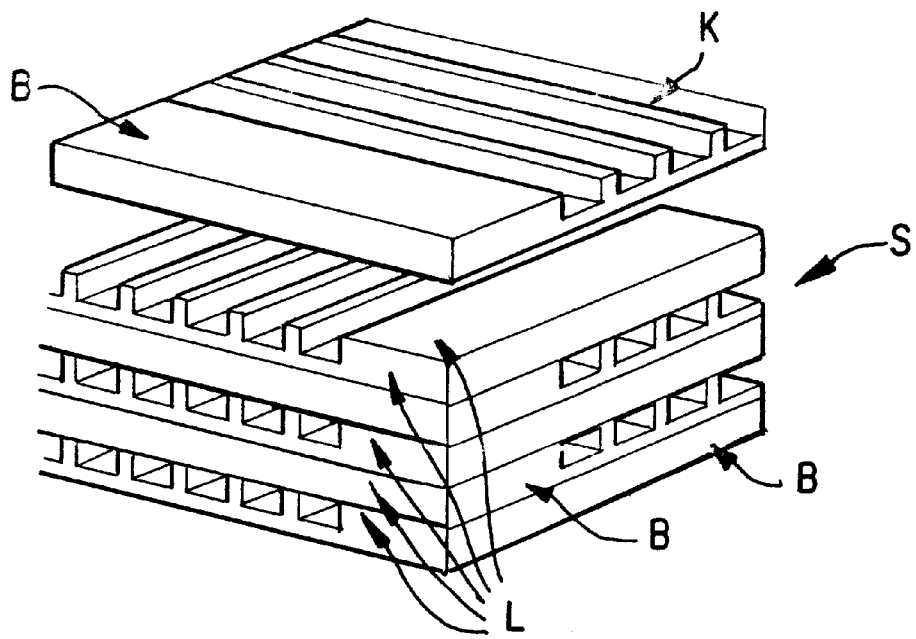
Figure 3B:
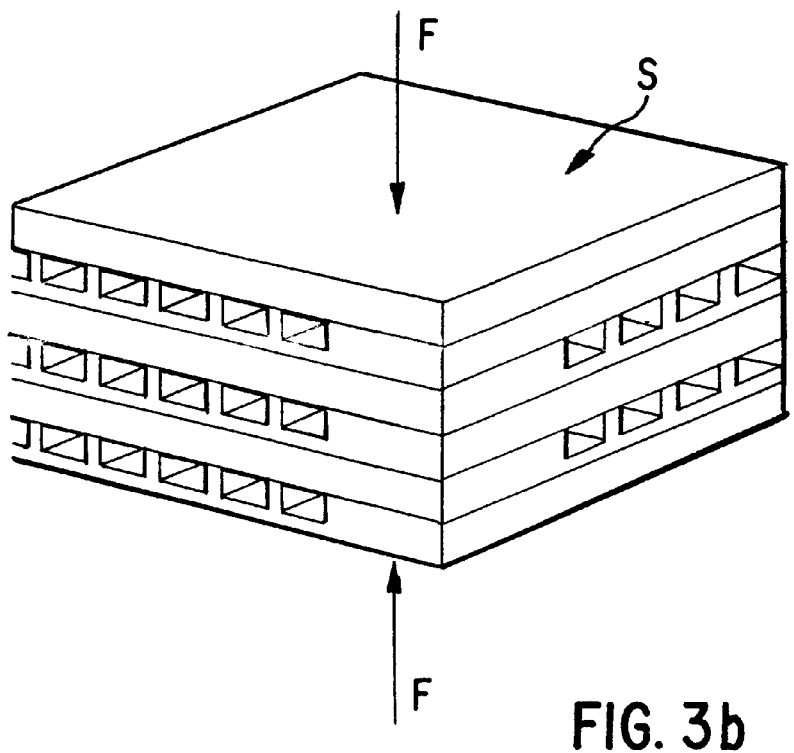

In the embodiment of the invention shown in FIG. 2(d), as in the above described embodiment shown in 2(c), a thin, unchanneled metal foil MF is disposed between two channeled plates B (the second channeled plate is not shown). Here, the solder is applied only to the marginal areas of plate B and metal foil MF. The thin metal foil MF can be used as a diaphragm, e.g., for the separation of hydrogen.

In the embodiments shown in 2(b) and 2(d) dimensions (in mm) are given by way of example for the thickness (without solder layers) of plates B and the metal foil MF.

In all contemplated embodiments the plates to be joined have equal or alternately different thicknesses (e.g., 0.025 and 1 mm) and may be channeled or unchanneled.

In the next step (FIG. 3, top), the stacking (cassette formation) of the channeled plates B coated with solder L is performed. The result is a stack S, in which a solder layer L is present between each pair of adjacent plates. In the embodiment represented in FIG. 3, the plates are aligned, for example, such that the channels of adjacent plates are at right angles to one another.

In an alternative embodiment of the method according to the invention, uncoated plates and solder foils, which have previously been cut to size accordingly, are stacked alternately one on top of the other.

Typical dimensions for the stack height and number of stacked plates are up to 100 mm and up to 150 plates, respectively.

In another step (FIG. 3, bottom), in order to make a component, the soldering of the plates is performed in a vacuum or an inert atmosphere. Argon, nitrogen or hydrogen can be used as the inert atmosphere. The solder is melted by the application of heat (preferred soldering temperatures: 720 to 1280° C., especially 1020 to 1170° C.). To bring the distance between the metal surfaces that are to be joined to an order of magnitude in which the solder present will suffice for securely joining the plates, pressure is simultaneously applied to the stack S (indicated by the forces F).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for soldering metallic microstructured plates, comprising the steps of:
    preparing a stack by arranging solder layers having a thickness of 3 to 25 $\mu$m between pairs of adjacent plates; and
    applying heat to the stack in a vacuum or an inert atmosphere to solder the stack,
    wherein the plates have solder trapping channels.

2. The method according to claim 1, wherein the step of arranging solder layers comprises:
    coating the plates with solder; and
    stacking the plates coated with solder.

3. The method according to claim 2, wherein the step of coating the plates comprises:

applying one of a foil, paste, powder, or galvanic solder to the plates.

4. The method according to claim 1, wherein the step of arranging solder layers comprises:

laying solder layers between the plates when the stacks are made.

5. The method according to claim 1, wherein the solder layers are applied to at least one of structured and unstructured surfaces of the plates or to portions of the plates.

6. The method according to claim 1, further comprising the step of:

pressing the stack together during soldering to provide a distance between adjacent plates in the stack of less than 10 $\mu$m.

7. The method according to claim 4, further comprising the step of:

pressing the stack together during soldering to provide a distance between adjacent plates in the stack of less than 10 $\mu$m.

8. The method according to claim 1, wherein at least one of the plates is an unchanneled connecting plate or a membrane disposed between two microstructured plates.

9. The method according to claim 4, wherein at least one of the plates is an unchanneled connecting plate or a membrane disposed between two microstructured plates.

10. The method according to claim 1, wherein the plates are a material selected from the group consisting of steel, Ni, Ni alloys, Pd, Pd alloys, Pb, Pb alloys, Cu and Cu alloys.

11. The method according to claim 10, wherein the steel is 1.4301, 1.4401, 1.4404, 1.4541 or 1.4571.

12. The method according to claim 5, wherein the plates are one of steel, Ni, Ni alloys, Pd, Pd alloys, Cu and Cu alloys.

13. The method according to claim 1, wherein the solder layer is a material selected from the group consisting of:

Cu, Cu alloys, Ni alloys, Au, Au alloys, Ag and Ag alloys.

14. The method according to claim 13, wherein the Cu alloys are copper-palladium alloys having 15 to 20 weight percent palladium.

15. The method according to claim 13, wherein the Ni alloys are nickel-phosphorus alloys having 7 to 14 weight percent phosphorus.

16. The method according to claim 15, wherein the Ni alloys are nickel-phosphorus alloys having 9 to 12 weight percent phosphorus.

17. The method according to claim 13, wherein the Au alloys are gold-nickel alloys having 10 to 22 weight percent nickel.

18. The method according to claim 17, wherein the Au alloys are gold-nickel alloys having 15 to 20 weight percent nickel.

19. The method according to claim 13, wherein the Ag alloys are silver-titanium alloys having 2 to 6 weight percent a titanium.

20. The method according to claim 19, wherein the Ag alloys are silver-titanium alloys having 3 to 5 weight percent.

21. The method according to claim 1, wherein portions of an area of the plates are pre-treated with an agent for preventing wetting of the area by the solder.

22. The method according to claim 5, wherein portions of an area of the plates are pre-treated with an agent for preventing wetting of the area by the solder.

23. The method according to claim 1, wherein the stack is one of a microreactor, micro heat transfer device, oil heated evaporator, catalytically heated evaporator or a diaphragm module for $H_2$ separation.

24. The method according to claim 23, wherein the stack is utilized in fuel cell systems having integrated hydrogen production for mobile applications.

25. The method according to claim 24, wherein the fuel cell systems are arranged in a vehicle.

26. A method for soldering metallic microstructured plates, comprising:

preparing a stack by arranging solder layers having a thickness of 3 to 25 $\mu$m between pairs of adjacent plates; and applying heat to the stack in a vacuum or an inert atmosphere to solder the stack, wherein said solder layers comprise a material selected from the group consisting of copper-palladium alloys, nickel-phosphorus alloys, gold-nickel alloys, and silver-titanium alloys.

27. A method for soldering metallic microchanneled plates, comprising the steps of:

coating a plurality of microchanneled plates, each plate having a coating of solder about 3 to 25 $\mu$m thick;

stacking said plurality of microchanneled plates, thereby forming a stack; and applying heat to the stack in a vacuum or an inert atmosphere to solder the stack, wherein the microchanneled plates have solder trapping channels.

* * * * *